US012659762B2

(12) United States Patent
Liu et al.

(10) Patent No.: US 12,659,762 B2
(45) Date of Patent: Jun. 16, 2026

(54) NETWORK OPTIMIZATION METHOD, SYSTEM AND STORAGE MEDIUM

(71) Applicant: ZTE CORPORATION, Shenzhen (CN)

(72) Inventors: Zhuang Liu, Shenzhen (CN); Yin Gao, Shenzhen (CN); Jiajun Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 700 days.

(21) Appl. No.: 17/923,098

(22) PCT Filed: Jan. 25, 2021

(86) PCT No.: PCT/CN2021/073544
§ 371 (c)(1),
(2) Date: Nov. 3, 2022

(87) PCT Pub. No.: WO2021/238277
PCT Pub. Date: Dec. 2, 2021

(65) Prior Publication Data
US 2023/0180025 A1     Jun. 8, 2023

(30) Foreign Application Priority Data

May 24, 2020    (CN) .......................... 202010445463.4

(51) Int. Cl.
*H04W 24/02* (2009.01)
*H04L 41/16* (2022.01)
*H04W 24/10* (2009.01)

(52) U.S. Cl.
CPC ............. *H04W 24/02* (2013.01); *H04L 41/16* (2013.01); *H04W 24/10* (2013.01)

(58) Field of Classification Search
CPC ...... G06N 20/00; G06N 3/098; G06N 3/0985; H04W 24/02; H04W 24/08; H04W 24/10;
(Continued)

(56) References Cited

U.S. PATENT DOCUMENTS 9,131,390 B2 *   9/2015   Kakadia ................ H04L 41/083
9,301,205 B2 *   3/2016   Ghai ..................... H04L 43/028
(Continued)

FOREIGN PATENT DOCUMENTS

CN          106507398 A        3/2017
CN          107276785 A        10/2017
(Continued)

OTHER PUBLICATIONS

International Search Report in Application No. PCT/CN2021/073544 dated Apr. 21, 2021, 4 pages, including English translation.
(Continued)

*Primary Examiner* — Matthew C Sams
(74) *Attorney, Agent, or Firm* — Morgan, Lewis & Bockius LLP

(57) ABSTRACT

A network optimization method includes determining network side measurement control information according to pre-acquired policy information to be satisfied by a network; sending a session setup request to a designated network side device to request the designated network side device to perform, according to the network side measurement control information, measurement configuration on the designated network side device and measurement configuration on a user equipment (UE) connected to the designated network side device; receiving a measurement report of the designated network side device and a measurement report of the UE; and performing, based on measurement data in received measurement reports and the policy information, machine learning for network optimization to obtain a network opti- (Continued)

mization operation instruction, where the network optimization operation instruction is used for indicating the designated network side device and the UE to perform the network optimization according to the network optimization operation instruction.

20 Claims, 6 Drawing Sheets

(58) Field of Classification Search
CPC ... H04W 28/16; H04W 24/04; H04W 72/535; H04W 72/04; H04L 41/16; H04L 41/0823; H04L 41/142; H04L 41/083; H04L 41/145; H04L 41/147; H04L 43/08; H04L 43/04
See application file for complete search history.

(56) References Cited

U.S. PATENT DOCUMENTS

| | | | | |
|---|---|---|---|---|
| 10,039,016 | B1 * | 7/2018 | Larish | H04W 24/02 |
| 10,986,516 | B2 * | 4/2021 | Dao | H04W 24/08 |
| 11,917,527 | B2 * | 2/2024 | Chou | H04W 48/18 |
| 2014/0098762 | A1 * | 4/2014 | Ghai | H04L 43/028 |
| | | | | 370/329 |
| 2014/0241159 | A1 | 8/2014 | Kakadia et al. | |
| 2016/0302087 | A1 * | 10/2016 | Luo | H04W 24/02 |
| 2018/0262924 | A1 * | 9/2018 | Dao | H04W 72/535 |
| 2018/0295013 | A1 * | 10/2018 | Deb | G06F 16/248 |
| 2019/0014488 | A1 * | 1/2019 | Tan | G06N 3/08 |
| 2019/0239238 | A1 | 8/2019 | Calabrese et al. | |
| 2022/0029892 | A1 * | 1/2022 | Hooli | H04L 41/0823 |
| 2022/0116799 | A1 * | 4/2022 | Wang | H04B 7/0452 |
| 2023/0180025 | A1 * | 6/2023 | Liu | H04W 24/02 |
| | | | | 455/414.1 |
| 2023/0216745 | A1 * | 7/2023 | Chen | H04W 24/02 |
| | | | | 370/252 |
| 2025/0008376 | A1 * | 1/2025 | Kim | H04W 28/08 |
| 2025/0328775 | A1 * | 10/2025 | Semiari | G06N 3/092 |

FOREIGN PATENT DOCUMENTS

| | | | | | |
|---|---|---|---|---|---|
| CN | 110139289 | A | | 8/2019 | |
| CN | 110383877 | A | | 10/2019 | |
| CN | 110536314 | A | | 12/2019 | |
| CN | 112512058 | A | * | 3/2021 | G06N 3/098 |
| CN | 110536314 | B | * | 12/2022 | H04L 65/1104 |
| CN | 110139289 | B | * | 2/2023 | H04W 24/02 |
| WO | WO-2018068857 | A1 | * | 4/2018 | H04W 24/08 |
| WO | WO-2019154371 | A1 | * | 8/2019 | H04W 24/02 |
| WO | WO-2020121084 | A1 | * | 6/2020 | H04L 41/147 |

OTHER PUBLICATIONS

Extended European Search Report in Application No. 21812406.3, dated May 21, 2024, 18 pages.
Qi Sun China Mobile PR China: "New draft Recommendation Y.ML-IMT2020-Data-Handling "Framework of data handling to enable machine learning in future networks including IMT-2020", output of Q20/13 meeting, Geneva, Jun. 17-28, 2019; TD399/WP1)", ITU-T Draft; Study Period 2017-2020; Study Group 13; Series TD399/WP1), International Telecommunication Union, Geneva ; CH vol. 20/13, Jun. 27, 2019, pp. 1-4.
Fujitsu: "Fujitsu Views on Rel-17 RAN Enhancements", 3GPP TSG RAN Meeting #84, Newport Beach, USA, Jun. 3-6, 2019; RP-190955, Mobile Competence Centre; 650, Route Des Lucioles; F-06921 Sophia-Antipolis Cedex; France.
ZTE (Moderator): "Summary of Rel-17 email discussion on AI-based network", 3GPP TSG-RAN #86, Sitges, Spain, Dec. 9-12, 2019; RP-192579, Mobile Competence Centre; 650, Route Des Lucioles; F-06921 Sophia-Antipolis Cedex; France.
First Search Report in Chinese Application No. 2020104454634, dated Nov. 7, 2024, 8 pages.
First Office Action in Chinese Application No. 202010445463.4, dated Nov. 11, 2024, 15 pages.

* cited by examiner

NETWORK OPTIMIZATION METHOD, SYSTEM AND STORAGE MEDIUM

CROSS REFERENCE TO RELATED APPLICATIONS

This is a national stage application filed under 37 U.S.C. 371 based on International Patent Application No. PCT/CN2021/073544, filed on Jan. 25, 2021, which claims priority to Chinese Patent Application No. 202010445463.4 filed with the CNIPA on May 24, 2020, the disclosure of which is incorporated herein by reference in its entirety.

TECHNICAL FIELD

The present application relates to the field of communication technology, for example, a network optimization method, a server, a network side device, a system and a storage medium.

BACKGROUND

The 5th Generation Wireless Systems Network (5G) is being deployed and is expected to grow Beyond 5G (B5G) in the future.

When the network is optimized, there is no network intelligence scheme in which the Artificial Intelligence (AI) function is configured for the communication network, so that the network intelligence optimization flow is performed based on the AI.

SUMMARY

The present application provides a network optimization method, a server, a network side device, a system and a storage medium.

Embodiments of the present application provide a network optimization method. The method includes: determining network side measurement control information according to pre-acquired policy information to be satisfied by a network; sending a session setup request to a designated network side device to request the designated network side device to perform, according to the network side measurement control information, measurement configuration on the designated network side device and measurement configuration on a user equipment (UE) connected to the designated network side device; receiving a measurement report of the designated network side device and a measurement report of the UE; and performing, based on measurement data in received measurement reports and the policy information, machine learning for network optimization to obtain a network optimization action instruction, where the network optimization action instruction is used for indicating the designated network side device and the UE to perform the network optimization according to the network optimization action instruction.

Embodiments of the present application further provide a network optimization method. The method includes: in response to receiving a session setup request from a predetermined server, performing, according to network side measurement control information in the session setup request, measurement configuration on the network side device and measurement configuration on the UE connected to the network side device; and sending a measured measurement report of the network side device and a received measurement report of the UE to the predetermined server, where the measurement report of the network side device and the measurement report of the UE are used for performing machine learning for network optimization in the predetermined server.

Embodiments of the present application further provide a server. The server includes a measurement control information determination module, a measurement configuration request module, a measurement report receiving module and a machine learning module.

The measurement control information determination module is configured to determine network side measurement control information according to pre-acquired policy information to be satisfied by a network; the measurement configuration request module is configured to send a session setup request to a designated network side device to request the designated network side device to perform, according to the network side measurement control information, measurement configuration on the designated network side device and measurement configuration on the UE connected to the designated network side device; the measurement report receiving module is configured to receive a measurement report of the designated network side device and a measurement report of the UE; and the machine learning module is configured to perform, based on measurement data in received measurement reports and the policy information, machine learning for network optimization to obtain a network optimization action instruction, where the network optimization action instruction is used for indicating the designated network side device and the UE to perform the network optimization according to the network optimization action instruction.

Embodiments of the present application further provide a network side device. The network side device includes a measurement configuration module, and a measurement report sending module.

The measurement configuration module is configured to, in response to receiving a session setup request from a predetermined server, perform, according to network side measurement control information in the session setup request, measurement configuration on the network side device and measurement configuration on the UE connected to a current network side device; and the measurement report sending module is configured to send a measured measurement report of the current network side device and a received measurement report of the UE to the predetermined server, where the measurement report of the current network side device and the measurement report of the UE are used for performing machine learning for network optimization in the predetermined server.

Embodiments of the present application further provide a server. The server includes one or more processor, and a memory. The memory is configured to store one or more programs. When executing the one or more programs, the one or more processors perform the first network optimization method of any embodiment of the present application.

Embodiments of the present application further provide a network side device. The network side device includes one or more processor, and a memory. The memory is configured to store one or more programs. When executing the one or more programs, the one or more processors perform the second network optimization method of any embodiment of the present application.

Embodiments of the present application further provide a network optimization system including a server and one or more network side devices. The server is configured to perform the first network optimization method described above; and the one or more network side devices are configured to perform the second network optimization method described above.

Embodiments of the present application further provide a storage medium storing a computer program which, when executed by a processor, causes the processor to implement any network optimization method in the embodiments of the present application.

According to the network optimization method, the server, the network side device, the system, and the storage medium in the embodiments of the present application, the network side measurement control information can be determined based on the pre-acquired policy information to be satisfied by a network, the network side device can be requested to perform the measurement configuration on the network side device according to the network side measurement control information and perform the measurement configuration on the UE side device, and the network optimization action can be obtained according to the received measurement data for training the machine learning model and measured by the radio network side device and the UE side device, thus performing depth analysis on the collected data by artificial intelligence and machine learning in the network system, thereby providing a new optimization method and a network intelligence optimization flow for the operator network optimization.

According to the network optimization method, the server, the network side device, the system, and the storage medium in the embodiments of the present application, the measurement configuration can be performed according to the received network side measurement control information and performed on the connected UE, the measurement report obtained by executing the measurement and the measurement report received by the UE are sent to the predetermined server, and the measurement report of the network side device and the measurement report of the UE are used for performing the machine learning for the network optimization in the artificial intelligence (AI) server, thus performing depth analysis on the data collected by the network side device and the UE in the artificial intelligence and the machine learning, thereby providing a new optimization method and a network intelligence optimization flow for the operator network optimization.

DETAILED DESCRIPTION

Embodiments of the present application are described below in conjunction with drawings.

In the embodiments of the present application, while 5G networks bring fundamental changes in performance and flexibility, the complexity of the network operation is also increasing. Operators urgently need automation and intelligent means to reduce the network deployment, action and maintenance costs and improve network performance and user experience. The Self-Organized Network (SON) technology and Minimization of Drive Tests (MDT) in Long Term Evolution (LTE) and 5G play a significant role in the network optimization, but the goal of a flexible intelligent network is not achieved, so that the 5G networks are faced with challenges of joint optimization problems of key performance indicator (KPI) pf many networks. These indicators include, for example, delay, reliability, connection number density, user experience, and the like.

The network optimization method increasingly presents the problems of long reaction period, easy error and high cost. The measurement quantity in the radio access network (RAN) node device and the UE, on the one hand, can be used by the network management system to monitor the network KPI or assist the network vendor to optimize the radio resource management. However, there is no solution to how the network element where the AI function is located collects the measurement quantity. The embodiments of the present application provide a network optimization scheme. A new network optimization method is provided for operator network optimization through the collected data analyzed deeply by the artificial intelligence/machine learning, and an AI-based network intelligence optimization flow is supported in network architecture.

Figure 1:
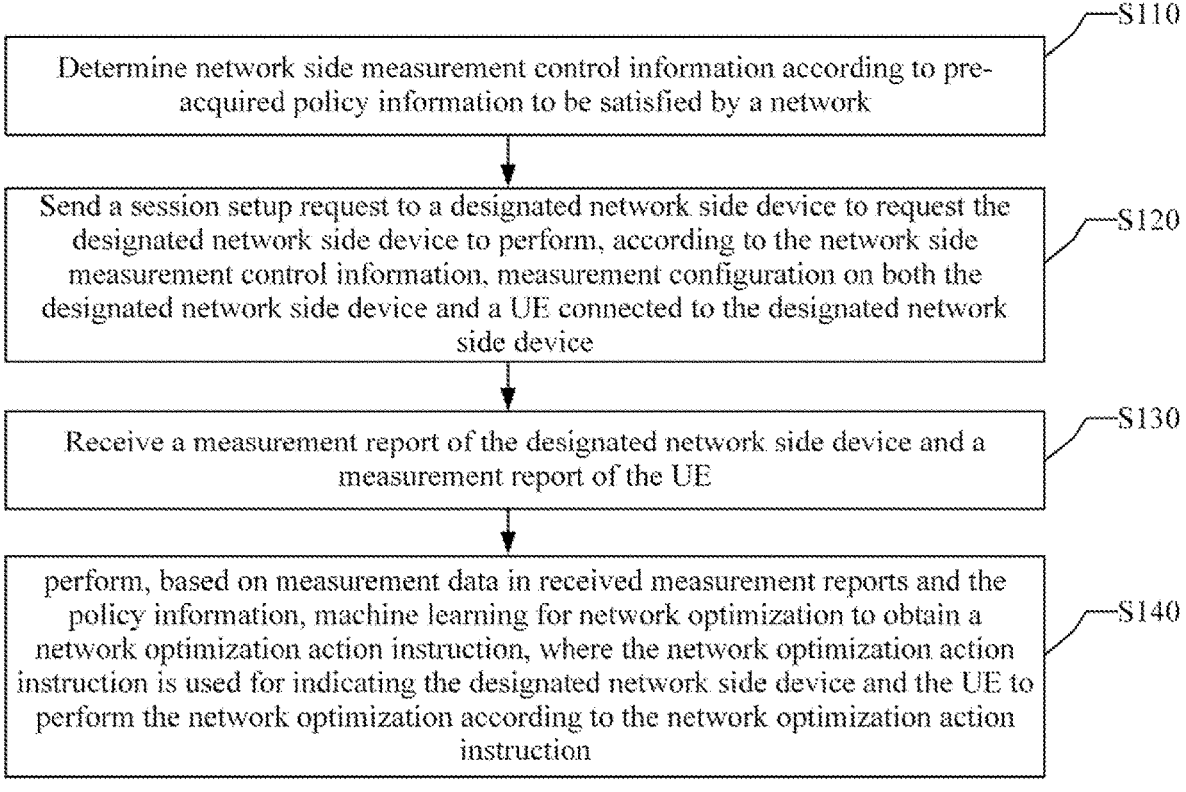
FIG. 1 is a flowchart of a network optimization method according to an embodiment of the present application.

FIG. 1 is a flowchart of a network optimization method according to an embodiment of the present application. In an embodiment, the network optimization method of the embodiment of the present application may be applicable to an AI server. As shown in FIG. 1, the network optimization method includes the following.

In S110, network side measurement control information is determined according to pre-acquired policy information to be satisfied by a network.

In S120, a session setup request is sent to a designated network side device to request the designated network side device to perform, according to the network side measurement control information, measurement configuration on both the designated network side device and a UE connected to the designated network side device.

In S130, a measurement report of the designated network side device and a measurement report of the UE are received.

In S140, based on the policy information and measurement data in received measurement reports, machine learning for network optimization is performed to obtain a network optimization action instruction which is used for indicating the designated network side device and the UE to perform the network optimization according to the network optimization action instruction.

According to the network optimization method in the embodiment of the present application, the AI server, according to the policy information to be satisfied by the network, can perform the measurement configuration on both the radio network side and the UE side device, and receive the measurement data measured by the radio network side and the UE side, and the received measurement data is used for training the machine learning model to obtain the network optimization action, thus performing depth analysis on the collected data by artificial intelligence and machine learning in the network system, so that a new optimization method is provided for the operator network optimization and an SI-based network intelligence optimization flow can be supported.

In the description of the embodiment of the present application, the network side device may be, for example, a 5G network or a RAN node in a B5G network. As an example, the RAN node includes, but is not limited to, a base station.

In an embodiment, before S110, the method further includes S01, acquiring pre-configured policy information to be satisfied by the network; or S02, in response to a received activation message, activating a machine learning function and acquiring policy information to be satisfied by the network and carried in the activation message.

In this embodiment, the policy information to be satisfied by the network may be directly configured on the AI server in advance, or may be acquired from the received activation message from an action administration and maintenance (OAM) system or a core network. The policy information to be satisfied by the network may be flexible, and may be set according to actual requirements.

Exemplarily, the received activation message may include an indication indicating whether the machine learning function is activated, the machine learning function is activated or closed according to the indication, and after the machine learning function is activated, the policy information required to be satisfied by the network carried in this activation message is obtained.

In an embodiment, the policy information may include object identity information and communication quality indicator information.

In this embodiment, S110 may include S111 and S112.

In S111, according to the entity identified by the object identity information, a network side device to which measurement needs to be performed is determined as the designated network side device.

In an embodiment, the policy information required to be satisfied by the network includes one or more of the following object identity information: one or more UE identities (UE ID), one or more quality of service (QoS) flow identities (QFI), one or more cell identities, one or more network slice identities, one or more public land mobile network identities (PLMN ID), one or more private network identities, one or more base station identities, or one or more tracking area code identities (TAC ID).

In this embodiment, if the entity identified by the object identity information is one or more UEs, the network side device required to be measured may be a network side device to which the identified UE is connected; if the entity identified by the object identity information is at least one of one or more quality of service flows, one or more cells, one or more network slices, one or more public land mobile networks, or one or more private networks, the network side device required to be measured may be a network side device involved within the identified entity communication range.

In this embodiment, the network side device required to be measured may also be flexibly selected according to the actual requirement of machine learning, and the embodiment of the present application is not limited.

In S112, according to the communication quality required to be achieved by the entity indicated by the communication quantity index information, a measurement quantity and a measurement reporting mode required to be configured by the designated network side device are determined as the network side measurement control information.

In an embodiment, the communication quality indicator information may be used for indicating the communication quality required to be achieved by the entity identified by the corresponding object identity information. Exemplarily, the communication quality indicator information may include one or more of a network energy saving indicator, a network KPI, a traffic quality of service indicator, a user quality of experience (QoE) indicator, a traffic-aware key quality indicator (KQI), or a traffic steering preference indicator.

Exemplarily, the network energy saving indicator may include, for example, one or more of energy saving efficiency, energy saving percentage indicator, or energy saving value.

As an example, the network KPI may include, for example, one or more of a handover success rate, a call drop rate, an access success rate, a user throughput rate, a cell throughput rate, a cell load, a network load, a radio resource utilization rate, or a network coverage rate.

As an example, the traffic quality of service indicator may include, for example, one or more of a traffic guarantee rate, a traffic maximum/minimum rate, a traffic delay, a traffic priority, a delay jitter, or a packet loss rate.

As an example, the user quality of experience indicator may include, for example, one or more of a mean opinion score (MOS) that evaluates the voice quality of the communication system, a streaming media open buffer time, a streaming media re-buffer time, or a number of streaming media re-buffer times.

By the above-mentioned S111 and S112, the AI server may indicate the network side device to perform measurement configuration and configure the UE according to the acquired policy information required to be satisfied by the network in advance.

In the description of the embodiment of the present application, the network action management and maintenance system may be simply referred to as a network management system, and the core network may be, for example, the 5th generation wireless systems core network (5GC), or a core network of a communication network beyond 5G.

In an embodiment, a deployment location of the current server is external to or internal to the network side device.

In S121, if the deployment location of the current server is external to the network side device, the session setup request message is sent to the designated network side device, where the session setup request message includes the network side measurement control information.

In S122, if the deployment location of the current server is internal to the network side device, the measurement configuration is performed on the network side device where the server is located according to the network side measurement control information, and the session setup request message is sent to the designated network side device, where the session setup request message includes the network side measurement control information.

In this embodiment, if the deployment location of the AI server is internal to the network side device, the network side device where the AI server is deployed also needs to perform measurement configuration according to the network side measurement control information. If the deployment position of the AI server is external to the network side device, the AI server may send a machine learning session setup request message or a session setup request message to the network side device to indicate the network side device to perform measurement configuration according to the network side measurement control information and to perform measurement configuration on the UE connected to the designated network side device.

In an embodiment, the session setup request carries the machine learning session identity and the network side measurement control information, where each machine learning session identity is used for uniquely identifying a machine learning process, and the network side measurement control information is used for indicating the measurement quantity required to be collected and the measurement reporting mode for the uniquely identified machine learning process.

In another embodiment, the session setup request carries the network side measurement control information, where the carried network side measurement control information is used for indicating the measurement quantity required to be collected and the measurement reporting mode for all machine learning processes.

That is, the session setup request carries the network side measurement control information. Optionally, a machine learning session ID may be carried. The machine learning session ID may be used for uniquely identifying a machine learning process, if the machine learning session identity is not included in the session setup request, it is indicated that the measurement control information in the session setup request is for all machine learning (ML) processes.

In the embodiment of the present application, the machine learning process may be used for representing a machine learning corresponding to the network side measurement control information carried in the session setup request. Exemplarily, the machine learning process may be determined according to different optimization indicators, for example, different optimization indicators are configured for different communication quality indicators, different optimization indicators correspond to different machine learning processes, or the machine learning process may be determined by a machine learning type including, but not limited to, any one of supervised learning, unsupervised learning, intensive learning, depth learning or migration learning; or the machine learning process may be determined by a machine learning model including, but not limited to, any one of a convolutional neural network, a recurrent neural network, a long short-term memory network, a support vector machine, an autoregressive integrated moving average model, or a decision-making tree.

In an embodiment, after performing S102, the method further includes in response to a received session setup response message, determining that the measurement configuration is successfully performed on the designated network side device and the UE.

In this embodiment, if the measurement configuration is successfully configured for the network side device and the UE, the network side device may send the session setup response message to the AI server, where the session setup response message carries a session setup success indication, or may carry the session setup success indication and the ML session ID.

In an embodiment, if the measurement configuration is unsuccessfully configured for the network side device and the UE, the network side device sends the machine learning session setup response message to the AI server, where the machine learning session setup response message carries a session setup failure indication. The session setup response message may carry a session identity, and the AI server resends the session setup request after receiving the session setup failure indication.

In an embodiment, the session setup request, the session setup response message, and the received measurement report each include a corresponding machine learning session identity, and the machine learning session identity is used for uniquely identifying a machine learning process.

In an embodiment, S130 may include the following.

In S131, the measurement report of the designated network side device and the measurement report of the UE sent by the designated network side device are received.

In this embodiment, the AI server is not directly connected to the UE, after the UE reports the measurement report to the network side device, the network side device sends the measurement report of the UE to the AI server, and the AI server can obtain the measurement report of the UE through a communication interface between the AI server and the network side device.

In an embodiment, the measurement data in the received measurement report includes the collected measurement quantity and the machine learning session identity, where the machine learning session identity is used for uniquely identifying the machine learning process.

In this embodiment, the measurement report message sent by the network side device to the AI server and the measurement report message sent by the UE may carry the measurement quantity, or may carry the measurement quantity and the session identity simultaneously.

In an embodiment, after performing S140, the method further includes sending a network action request message to the designated network side device, where the network action request message includes the network optimization action instruction and a corresponding action parameter.

In this embodiment, the AI server may inform the network side device to execute a related optimization action through the network action request message, where the optimization action may be one or more action indications and parameters required for the corresponding actions, including, but not limited to, a UE handover indication, a close/open cell indication, a radio resource activation/deactivation indication, a power adjustment indication, a radio resource management (RRM) parameter reconfiguration indication, a split action indication, a protocol layer parameter reconfiguration indication, and the like.

In an embodiment, the current server communicates with the designated network side device through the predetermined interface, and before performing S120, the method further includes S11 and S12.

In S11, if a deployment location of the current server is external to the network side device, a control plane interface between the current server and the designated network side device is set up and then is taken as the predetermined interface in response to a received control plane interface setup request message.

In S12, if a deployment location of the server is internal to the network side device, an existing communication transmission interface between the designated network side device and a network side device where the current server is located is acquired and then is taken as the predetermined interface.

In this embodiment, according to the deployment location of the current server, the communication interface between AI server and the network side device may be predetermined before the measurement configuration is performed on the network side device and the UE.

When the deployment location of the AI server is external the designated network side device, the AI server may set up the control plane interface between the AI server and the network side device in response to an interface setup request of the network side device; when the deployment position of the AI server is internal the designated network side device, the existing communication transmission interface between the AI server and the network side device can be directly used for performing communication, and a communication interface between the AI server and the network side device does not need to be additionally set up, thereby saving network resources. As an example, 5G network side device (e.g., base stations) may be connected via a core network, and communication between the base station and the core network may depend on optical fiber transmission. As an example, the 5G network side device may also be connected by a wired connection, a wireless connection, a wireless relay, and the like, and is not limited in the embodiment of the present application.

In an embodiment, the control plane interface setup request message includes at least one of the following information items: a measurement supported by the designated network side device, a reporting mode supported by the designated network side device, a network optimization action supported by the designated network side device or a data plane channel address of the designated network side device.

In an embodiment, when the AI server sends the session setup request to the designated network side measurement device, the network side measurement control information may be obtained according to a measurement quantity supported by the designated network side device and the reporting mode supported by the designated network side device, so that the measurement configuration of the network side device is more targeted, and the measurement configuration is performed on the measurement of the network side device according to the measurement supported by the network side device and the reporting mode supported by the designated network side device, thereby improving the processing efficiency and accuracy of the measurement configuration.

In an embodiment, the AI server sends a network action request message to the designated network side device, where the network action request message may include the network optimization action instruction and a corresponding operation parameter, thus improving efficiency and accuracy of the designated network optimization action instruction.

In an embodiment, the method further includes S21 and S22.

In S21, a control plane interface setup response message is sent to the designated network side device to indicate that the control plane interface is successfully set up. In S22, if the control plane interface setup request message includes the data plane channel address of the designated network side device, when the control plane interface setup response message is sent to the designated network side device, the control plane interface setup response message carries a data plane channel address of the current server.

In this embodiment, if the interface setup request received by the AI server carries the data plane channel address of the network side device, the interface setup response message may carry the data plane channel address of the AI server side for setting up the data plane channel between the AI server and the designated network side device.

In the embodiment of the present application, a control-type message required by the machine learning may be transmitted between the AI server and the network side device on the control plane channel. The control-level plane data includes, for example, network side measurement configuration information, sending a session setup request, receiving a session setup response, sending a network action request, receiving a network action response, and the like, and may also be used for receiving measurement data of the network side device, measurement data of the UE, and the like.

In order to improve the data transmission efficiency and not affect the transmission of the control-type message in the control plane channel between the AI server and the network side device when the amount of data of the measurement data of the UE is relative large, the data plane channel can be set up between the AI server and the network side device, and the data required by the machine learning can be transmitted on the data plane channel.

A large amount of data may be transmitted on the data plane channel, such as measurement data of a base station. However, the data plane channel set up in the present embodiment is not limited to transmitting measurement data from the designated UE.

According to the network optimization method in the embodiment of the present application, the AI server can configure and receive the measurement data of the radio network side and the measurement data measured by the UE side to train the machine learning model so as to obtain the network optimization action, thereby performing depth analysis on the collected data through the artificial intelligence and the machine learning, and using the intelligent network optimization method, providing a new optimization method for the operator network optimization and supporting an AI-based network intelligent optimization flow.

Figure 2:
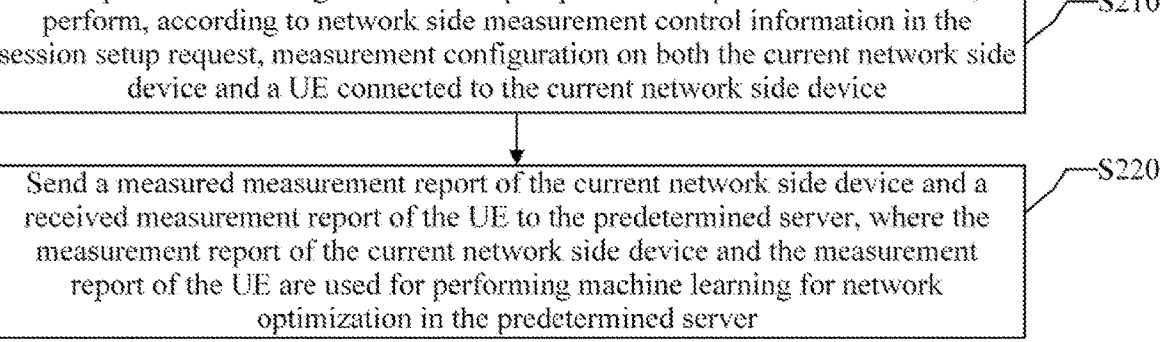
FIG. 2 is a flowchart of a network optimization method according to another embodiment of the present application.

FIG. 2 is a flowchart of a network optimization method according to another embodiment of the present application. In an embodiment, the network optimization method is applicable to a network side device. As shown in FIG. 2, the network optimization method includes the following.

In S210, in response to receiving a session setup request from a predetermined server, according to network side measurement control information in the session setup request, measurement configuration is performed on both the current network side device and a UE connected to the current network side device.

In S220, a measured measurement report of the current network side device and a received measurement report of the UE are sent to the predetermined server, where the measurement report of the current network side device and the measurement report of the UE are used for performing machine learning for network optimization in the predetermined server.

According to the network optimization method in the embodiment of the present application, the measurement configuration can be performed on the network side device according to the received network side measurement control information and performed on the UE connected to the network side device, the measurement report obtained by executing the measurement and the measurement report received by the UE are sent to the predetermined server, and the measurement report of the network side device and the measurement report of the UE are used for performing the machine learning for the network optimization in the AI server, thus performing depth analysis on the data collected by the network side device and the UE in the artificial intelligence and the machine learning, thereby providing a new optimization method and a network intelligence optimization flow for the operator network optimization.

In an embodiment, S210 may include the following.

S211, in response to the session setup request, the measurement configuration is performed according to the network side measurement control information, where the network side measurement control information is used for indicating a measurement quantity and a measurement reporting mode required to be configured by the current network side device; S212, according to the network side measurement control information, a measurement quantity and a measurement reporting mode to be configured by the UE connected to the network side device are determined as UE-side measurement control information; and S213, a first radio resource control message is sent to the UE to indicate the UE to perform the measurement configuration according to the UE-side measurement control information.

In this embodiment, the network side device may perform the measurement configuration on the network side according to the network side measurement control information carried in the session setup request from the AI server, and indicate the UE connected to the network side device to perform measurement configuration on the UE side.

In an embodiment, if the measurement configuration is successfully performed on the network side device and a measurement configuration response message of the UE is received, a session setup response message is sent to the predetermined server so as to feed back that the measurement configuration is successfully performed on both the current network side device and the UE to the predetermined server.

In an embodiment, the received session setup request, the session setup response message, and the measurement report sent to the predetermined server each include a corresponding machine learning session identity, and the machine learning session identity is used for uniquely identifying a machine learning process.

In an embodiment, the network side optimization method further includes: S240, receiving and executing a network optimization action instruction from the predetermined server; S241 if the network optimization action instruction involves the UE, determining an action in the network optimization action instruction related to the UE; and S242, sending a second radio resource control message to the UE to indicate the UE to perform the action related to the UE.

Through S240 to S242, the network side device executes the received network optimization action instruction, if the network optimization action instruction involves the UE, the network optimization action instruction is sent to the involved UE, so that the optimization action is performed on the network side and the UE side, and the network optimization is achieved according to the network optimization action instruction.

In an embodiment, the current network side device communicates with the predetermined server through the predetermined interface, and before performing S210, the method further includes S31 and S41.

S31, if a deployment location of the predetermined server is external to the network side device, according to an address of the predetermined server acquired in advance, a control plane interface setup request message is sent to the predetermined server to request the predetermined server to set up a control plane interface between the current network side device and the predetermined server and take the predetermined server as the predetermined interface.

In S41, if a deployment location of the server is internal to the network side device, an existing communication transmission interface between the current network side device and a network side device where the predetermined server is located is acquired and is then taken as the predetermined interface.

By the above S31 and S41, it is possible to set up the communication interface of the control panel interface between the current network side device and the predetermined server.

In an embodiment, the control plane interface setup request message includes at least one of the following information items: a measurement supported by the current network side device, a reporting mode supported by the current network side device, a network optimization action supported by the current network side device or a data plane channel address of the current network side device.

In this embodiment, the control plane interface setup request message is used for request the predetermined server, the network side measurement configuration information that the current network side device can support is sent according to the measurement supported by the current network side device and the reporting mode supported by the current network side device, so that the success rate and the processing efficiency of the measurement configuration of the network side can be improved.

In this embodiment, the control plane interface setup request message is further used for request the predetermined server, the network optimization action instruction that the current network side device can support is sent according to the network optimization action supported by the current network side device so as to perform the network optimization according to the received the network optimization action instruction that the current network side device can support, thereby improving the data processing performance of which the network side measures and executes the network optimization action instruction.

In an embodiment, the network optimization method further includes S250, in response to a received control plane interface setup response message, determining that a control plane interface between the network side device and the predetermined server is successful set up, where if the control plane interface setup request message includes the data plane channel address of the network side device, a received control plane interface setup response message includes a data plane channel address of the predetermined server.

In the embodiment, the network side device may send an interface setup request for requesting to set up a control plane interface between the network side device and the AI server according to the received address of the AI server, and the interface setup request may carry one or more of the following: a measurement supported by the network side device, a reporting mode of the measurement supported by the network side device, an RAN optimization action supported by the network side device, or data plane channel address of the network side device.

When the interface setup request carries the data plane channel address of the network side device, a data plane interface between the network side device and the AI server is set up in response to the data plane channel address of the AI server carried in the interface setup response. According to requirements, data transmission is performed between the network side device and the AI server by using the control plane interface and/or the data plane interface.

According to the network optimization method of the embodiment of the present application, the network side device can perform the measurement configuration on the network side device and the UE under the control of the AI server, and can send measurement data obtained by performing measurement on the network side device and measurement data obtained by performing measurement on the received UE to the AI server for performing machine learning for network optimization in the AI server, thereby receiving and executing a network optimization action instruction obtained by the machine learning to perform the network optimization.

Figure 3:
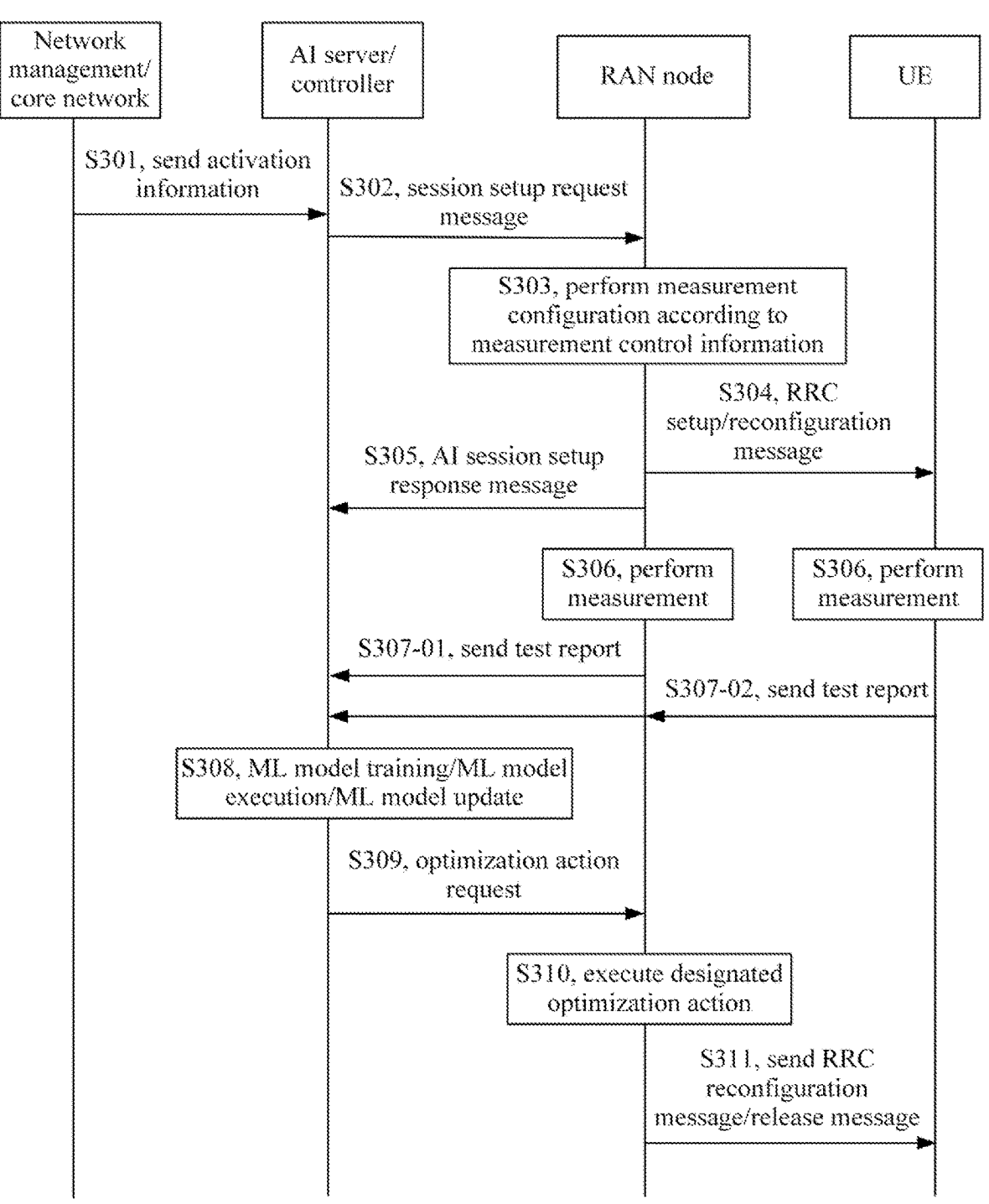
FIG. 3 is a flow timing diagram of a network optimization method according to an embodiment.

For a better understanding of the present application, the network optimization method of the embodiment of the present application is described in detail below through FIGS. 3 and 4. FIG. 3 is a flow timing diagram of a network optimization method according to an embodiment. As shown in FIG. 3, the AI server is arranged external to the network side device, and the network optimization method may include the following.

In S301, a network management system or a core network sends an activation message through an interface between the AI server and the network management system or the core network.

In this S301, the OAM or the 5GC sends the activation message for indicating the AI server to activate or use the machine learning function. The activation message includes an indication indicating whether the ML function is activated, and indicating policy information required to be satisfied by the RAN network side.

In S302, the AI server sends a machine learning session setup request message to the RAN node for configuring radio side measurement data required for a machine learning session.

In this S302, the machine learning session setup request message may include a machine learning session ID for uniquely identifying an ID of an ML process, and the measurement control information is used for indicating a measurement quantity and a measurement reporting manner required to be measured by the RAN node. If the session ID is not included in the machine learning session setup request message, it indicates that the measurement control in the request message is for all the ML processes.

In S303, the RAN node configures the measurement and the reporting mode required to be performed on the RAN node according to the measurement control information in the received message.

In S304, the RAN node configures the measurement control information of the UE side according to the measurement control information in the received message, and sends the measurement control information on the UE side to one or more UEs connected to the RAN node by using a radio resource control (RRC) setup/reconfiguration message, indicating the UE which measurements to make and how to report.

In S305, if both the measurement of the RAN node and the measurement of the UE side are successfully configured, the RAN node sends the machine learning session setup response message to the AI server, where the machine learning session setup response message carries a success indication and optionally carries the machine learning session ID (MLsession ID). If the measurement of the RAN node or the measurement of the UE side is unsuccessfully configured, the RAN node sends the machine learning session setup response message to the AI server, where the machine learning session setup response message carries a failure indication and optionally carries the machine learning session ID (MLsession ID).

In S306, if both the measurement of the RAN node and the measurement of the UE side are successfully configured, both the RAN node and the UE perform the related measurement according to the designated measurement configuration.

In S307-01, the RAN node sends a measurement report to the AI server.

In S307-02, the RAN node sends the received measurement report from the UE.

In these S307-01 and S307-02, the measurement report message may carry the measurement quantity or may carry the measurement quantity and the machine learning session ID to which the measurement belongs.

In S308, the AI server selects an appropriate ML algorithm for performing model training and model prediction and model update according to the measurement data and the configured policy information, and obtains the RAN action required for optimization.

In S309, the AI server sends a RAN action request message to inform the RAN node to perform the related optimization action.

In S310, the RAN node executes the related optimization action in the RAN action request message.

In S311, the RAN node sends the RRC reconfiguration message or the RRC release message to the UE connected to the RAN node for informing the UE to perform the related action.

According to the network optimization method in the embodiment, after the machine learning function of the AI server is activated, the measurement configuration is performed on the RAN node and on the UE connected to the RAN node through the RAN node. The RAN node and the UE perform measurement, and send the measurement report to the AI server. The AI server selects the appropriate ML algorithm for performing the model training, the model prediction and the model update according to the measurement data and the configured policy information, and obtains and sends the RAN action required for optimization, thereby performing network optimization by optimizing the required RAN action.

Figure 4:
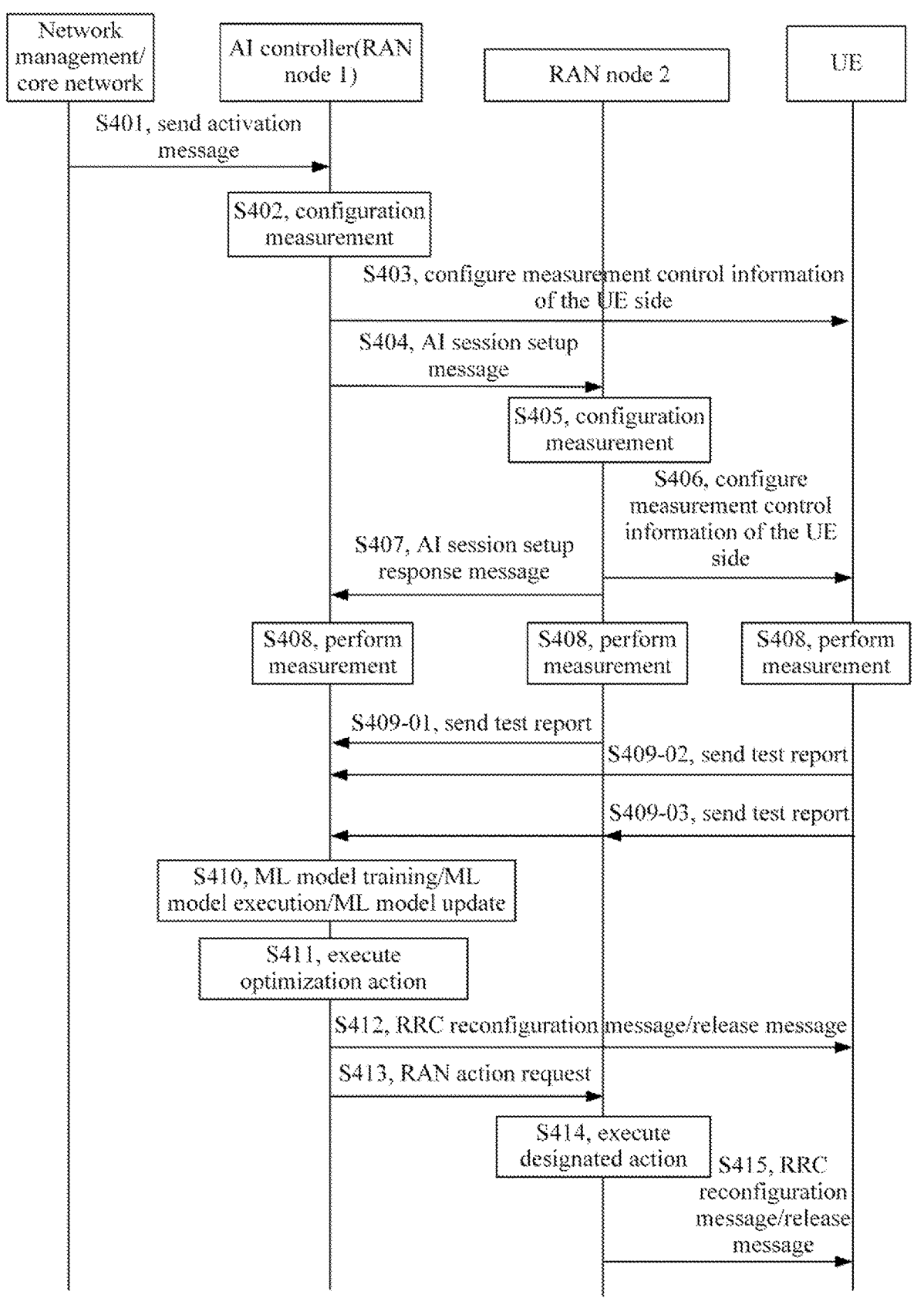
FIG. 4 is a flow timing diagram of a network optimization method according to another embodiment.

FIG. 4 is a flow timing diagram of a network optimization method according to another embodiment. As shown in FIG. 4, the AI server is arranged internal to the network side device, and the network optimization method may include the following.

In S401, a network management system or a core network sends an activation message through an interface between the AI server and the network management system or the core network.

In S402, the AI server configures the measurements required by an RAN node 1.

In S403, the RAN node 1 configures measurement control information of the UE side.

In this S403, the RAN node 1 carries the measurement control information of the UE side through the RRC setup/reconfiguration message, and sends the measurement control information of the UE side to one or more UEs connected to the RAN node 1 for indicating the UE to make which measurements and how to report.

In S404, the AI server sends a machine learning session setup request message to an RAN node 2 for configuring radio side measurement data required for a machine learning session.

In S405, the RAN node 2 configures the measurement quantity and the measurement reporting mode required to be measured by the RAN node 2 according to the measurement control information in the received message.

In S406, the RAN node 2 configures the measurement control information of the UE according to the measurement control information in the received message.

In this S406, the RAN node 2 can carry the measurement control information of the UE side through the RRC setup/reconfiguration message, and send the measurement control information of the UE side to one or more UEs connected to the this base station for indicating the UE to make which measurements and how to report.

In S407, if both the measurement of the RAN node 2 and the measurement of the UE side are successfully configured, the base station sends the machine learning session setup response message to the RAN node 1. The machine learning session setup response message carries a success indication, and the machine learning session setup response message optionally carries a machine learning session ID. If the measurement of the RAN node 2 and the measurement of the UE side are unsuccessfully configured, the RAN node2 sends the machine learning session setup response message to the RAN node 1, where the machine learning session setup response message carries a failure indication and optionally carries the machine learning session ID.

In S408, if both the measurement of the RAN node 2 and the measurement of the UE side are successfully configured, both the RAN node 2 and the UE perform the related measurement according to the designated measurement configuration. At the same time, the RAN node 1 also executes related measurement according to the measurement configured by the AI server.

In S409, the RAN node 1 receives a measurement report.

In this S409, the measurement report may be sent directly to the RAN node 1 by the UE connected to the RAN node 1 (corresponding to S409-02 in FIG. 4), the measurement report may be measured by the RAN node 2 and sent to the RAN node 1 (corresponding to S409-01 in FIG. 4), and the measurement report may be sent by the UE connected to the RAN node 2 to the RAN node 2 and forwarded by the RAN node 2 to the RAN node 1 (corresponding to S409-03 in FIG. 4).

In S410, the AI server selects an appropriate machine learning algorithm for performing model training and model prediction and model update according to the measurement data and the configured policy information, and obtains the RAN action required for optimization.

In S411, the AI server informs the RAN node 1 to execute the related optimization action.

S412, the RAN node 1 executes the related optimization action designated by the AI server.

In this S412, if the related optimization action involves one or more UEs, the RAN node 1 sends the RRC reconfiguration message or the RRC release message to the UE connected to the base station for informing the UE to execute the related action.

In S413, the RAN node 1 sends an RAN action request message for informing the RAN node 2 to execute the related optimization action.

The optimization action may be one or more action indications and parameters required for the corresponding action, such as a UE handover indication, a close/open cell indication, a radio resource activation/deactivation indication, a power adjustment indication, an RRM parameter reconfiguration indication, a split action indication, a protocol layer parameter reconfiguration indication, etc.

In S414, the RAN node 2 executes the related optimization action in the RAN action request message.

In S415, the RAN node 2 sends the RRC reconfiguration message or the RRC release message to the UE connected to the RAN node 2 for informing the UE to execute the related action.

In this S415, if the related optimization action involves one or more UEs, the RAN node 2 sends the RRC reconfiguration message or the RRC release message to the UE connected to the base station for informing the UE to execute the related action.

As can be seen from the above content, the network optimization method in FIG. 4 is basically the same as the network optimization method in FIG. 3, except that the RAN node in which the AI server is deployed also needs to perform the measurement configuration and executes the measurement. When the base station in which the AI server is deployed needs to execute the RAN optimization action, if the related optimization action involves one or more UEs, the RAN node where the AI server is located can send the RRC reconfiguration message or the RRC release message to the UE connected to the RAN node to indicate the UE connected to the RAN node to execute the designated optimization action.

In the embodiment of the present application, the base station in which the AI server is deployed may send the ML session setup request and receive the ML session response message through an interface between the base station and another base station for requesting adjacent base stations to participate the RAN optimization action, without additionally setting up a communication interface between the AI server and the network side device, thereby saving network resources.

Figure 5:
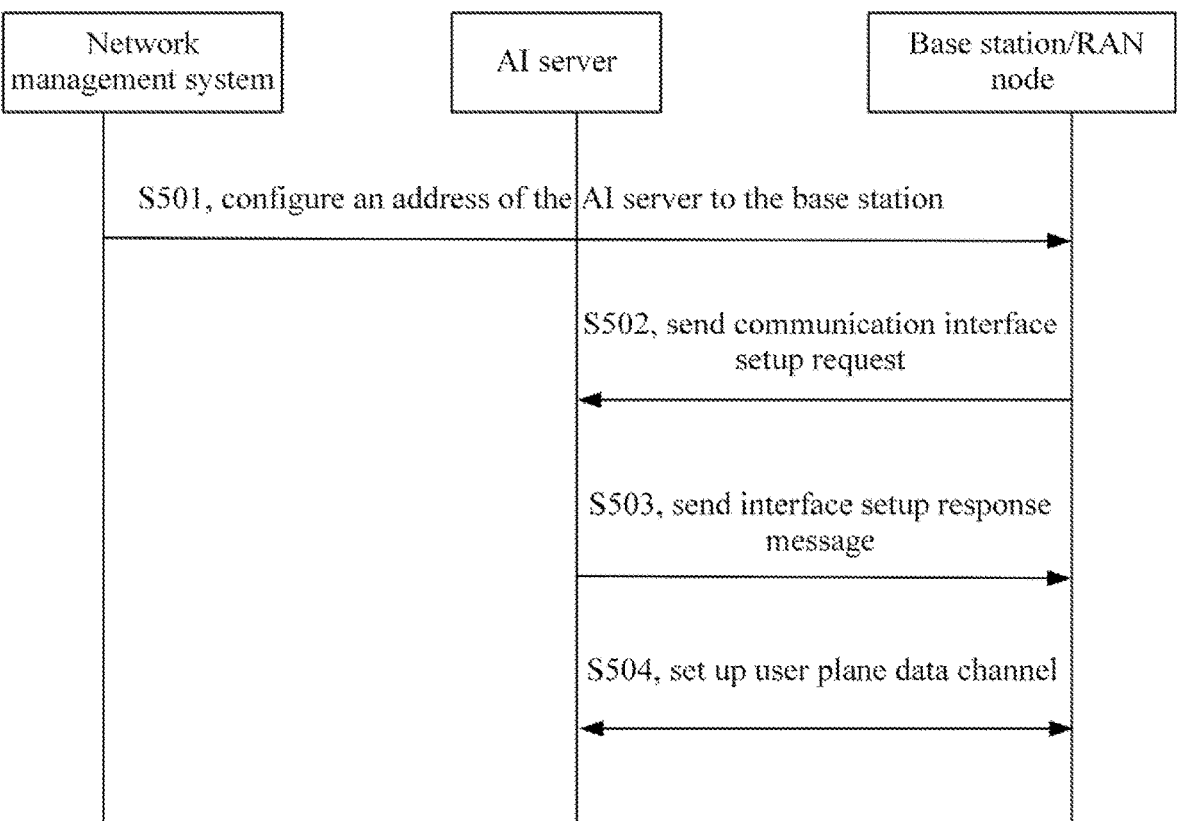
FIG. 5 is a flowchart for setting up a communication interface between a server and a network side device according to an embodiment.

FIG. 5 is a flowchart for setting up a communication interface between an AI server and an RAN node according to an embodiment. As shown in FIG. 5, in an embodiment, an interface setup process may include the following.

In S501, when the AI server is deployed external to the RAN node, the network management manager directly configures the address of the AI server to the base station or configures the address of the AI server to the base station through the configuration message.

In some embodiments, if the AI server is deployed internal to the RAN node, S501 does not need to be performed.

In S502, the base station sends a communication interface setup request according to the configured address of the AI server.

In this S502, if an interface between the AI server and the RAN node is referred to as an AI interface, the RAN node sends an AI interface setup request message to the address of the AI server for setting up the AI interface.

In an embodiment, the communication interface setup request may include the measurement supported by the network side device (e.g., a base station), a reporting mode of the measurement supported by the network side device, and the RAN optimization action supported by the network side device.

In an embodiment, the communication interface setup request may also include a data plane channel address of the network side device.

In S503, the AI server sends an interface setup response message to the base station for indicating whether the interface is successfully set up.

In this S503, if the communication interface setup request received by the AI server in S502 carries the data plane channel address of the network side device, the interface setup response message may carry the data plane channel address of the AI server side.

By the above S501 to S503, the control plane interface for the RAN node of the AI server may be set up, and the control plane interface may be used for transmitting a control message or may also be used for transmitting data required for machine learning, such as measurement data.

In S504, the data plane channel is set up according to the data plane channel address configured by the AI server and the data plane channel address of the base station side.

In the implementation of the present application, data required for the machine learning may be transmitted between the network side device and the AI server on the data plane channel. For example, some large amount of data may be transmitted on the data plane channel, such as measurement data from the base station, to alleviate data transmission pressure of a communication channel corresponding to the control plane interface and improve data transmission efficiency. The data plane channel set up in the present embodiment is not limited to transmitting data of the designated user.

Figure 6:
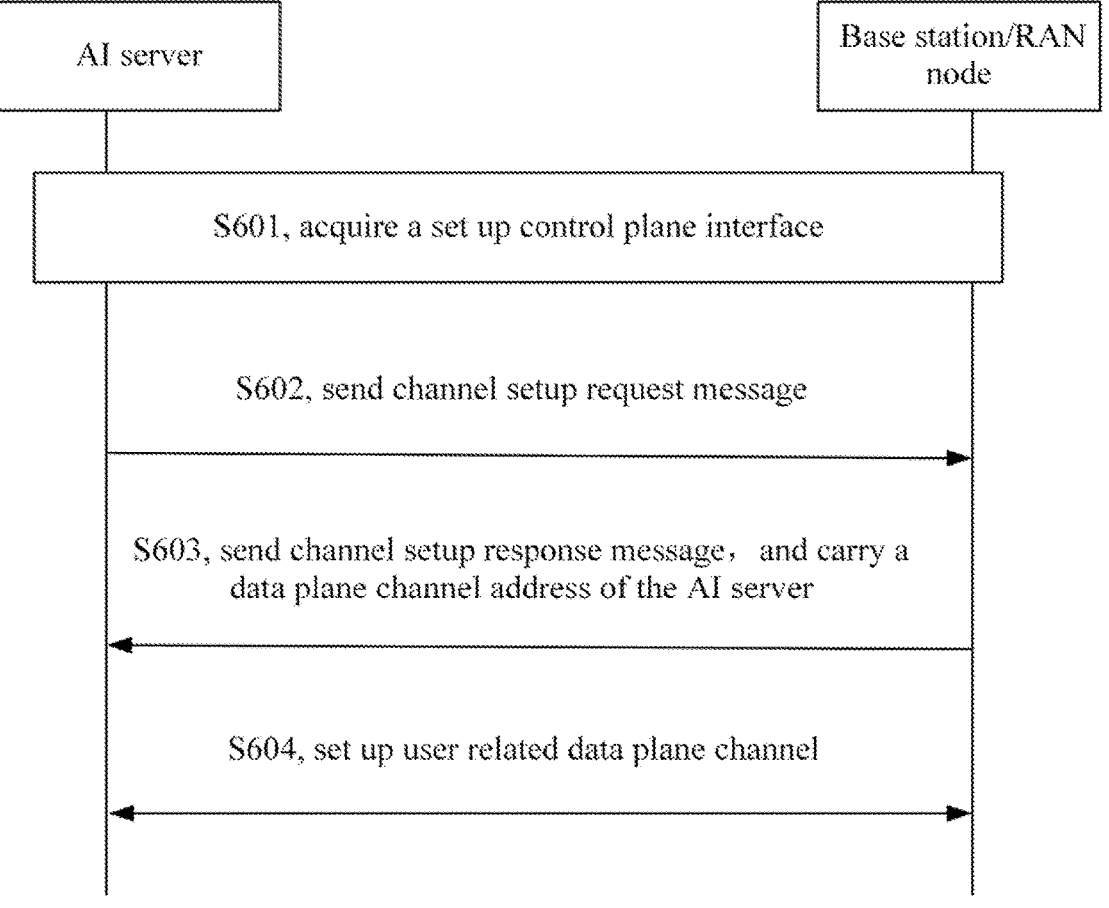
FIG. 6 is a flowchart for setting up a data channel related to a UE and a predetermined server according to an embodiment.

FIG. 6 is a flowchart for setting up a data channel related to a UE and an AI server according to an embodiment. As shown in FIG. 6, in an embodiment, an interface setup process may include the following.

In S601, an AI control plane interface set up between the AI server and the RAN node (e.g., a base station) is acquired.

The AI server may be deployed external to the RAN node, or the AI server may be deployed internal to one RAN node.

In S602, the AI server or the base station where the AI server is located, sends a channel setup request message to the adjacent base stations.

As an example, the channel setup request message may be, for example, a UE context setup request message, and carries a data plane channel address of the AI server side and a UE identity (UE ID).

In S603, the base station sends a channel setup response message to the AI server or the base station where the AI server is located.

As an example, the channel setup response message may be, for example, a UE context setup response message, and carries a data plane channel address of the base station side.

In S604, the data plane channel designated by the UE ID and related to a specific user is set up according to the data plane channel address configured by the AI server and the data plane channel address of the base station side.

In this example, ML-required data related to the specific user may be transmitted on the data plane channel between the RAN node and the AI server, and generally, some large amount of data may be transmitted on the data plane channel, such as the measurement data of the user.

In the embodiment of the present application, data required for the machine learning may be transmitted between the RAN node and the AI server on the data plane channel. For example, some large amount of data may be transmitted on the data plane channel, such as measurement data from the base station, to alleviate data transmission pressure of a communication channel corresponding to the control plane interface and improve data transmission efficiency. The data plane channel set up in the present embodiment is not limited to transmitting data of the designated user.

Figure 7:
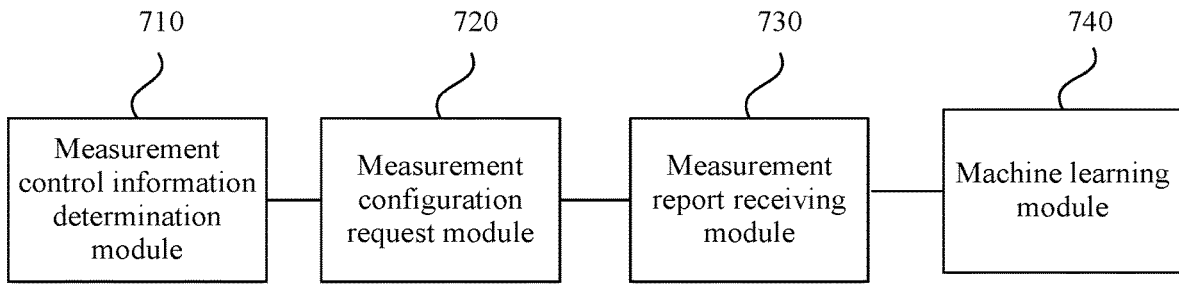
FIG. 7 is a structural diagram of a server according to an embodiment of the present application.

A server in the embodiment of the present application is described below in connection with drawings. FIG. 7 is a structural diagram of a server according to an embodiment of the present application. In an embodiment, the server may be an AI-capable server, referred to as an AI server, as shown in FIG. 7, the server may include a measurement control information determination module 710 and a measurement configuration request module 720, a measurement report receiving module 730, and a machine learning module 740.

The measurement control information determination module 710 is configured to determine network side measurement control information according to pre-acquired policy information to be satisfied by a network.

The measurement configuration request module 720 is configured to send a session setup request to a designated network side device to request the designated network side device to perform, according to the network side measurement control information, measurement configuration on the designated network side device and measurement configuration on a UE connected to the designated network side device.

The measurement report receiving module 730 is configured to receive a measurement report of the designated network side device and a measurement report of the UE.

The machine learning module 740 is configured to perform, based on measurement data in received measurement reports and the policy information, machine learning for network optimization to obtain a network optimization operation instruction, where the network optimization operation instruction is used for indicating the designated network side device and the UE to perform the network optimization according to the network optimization operation instruction.

In an embodiment, the server further includes a policy information acquisition module, which is configured to acquire pre-configured policy information to be satisfied by the network; or in response to a received activation message, activate a machine learning function and acquire policy information to be satisfied by the network and carried in the activation message.

In an embodiment, the policy information includes object identity information and communication quality indicator information, and the communication quality indicator information is used for indicating the communication quality required to be achieved by an entity identified by the object identity information. In this embodiment, the measurement control information determination module 710 may be configured to determine, according to the entity identified by the object identity information, a network side device to which measurement needs to be performed as the designated network side device, and determine, according to the communication quality required to be achieved by the entity indicated by the communication quantity indicator information, a measurement quantity and a measurement reporting mode that the designated network side device needs to configure as the network side measurement control information.

In an embodiment, a deployment location of the current server is external to or internal to the network side device. In this embodiment, the measurement configuration request module 720 may be configured to send, in a case where the deployment location of the server is external to the network side device, the session setup request message to the designated network side device, where the session setup request message includes the network side measurement control information, and perform, in a case where the deployment location of the server is internal to the network side device, the measurement configuration on the network side device where the server is located according to the network side measurement control information, and send the session setup request message to the designated network side device, where the session setup request message includes the network side measurement control information.

In an embodiment, the server further includes a session setup response module, which is configured to, in response to a received session setup response message, determine that the measurement configuration is successfully performed on the designated network side device and the UE.

In an embodiment, the session setup request, the session setup response message, and the received measurement report each include a corresponding machine learning session identity, and the machine learning session identity is used for uniquely identifying a machine learning process.

In an embodiment, the measurement report receiving module 730 can be configured to receive a measurement report of the designated network side device and a measurement report of the UE sent by the designated network side device.

In an embodiment, the server further includes a network action request sending module, which is configured to send a network action request message to the designated network side device, where the network action request message includes the network optimization action instruction and a corresponding action parameter.

In an embodiment, the current server communicates with the designated network side device through a predetermined interface. The server further includes a first predetermined interface determination module and a second predetermined interface determination module. The first predetermination interface determination module is configured to set up, in a case where a deployment location of the current server is external to the network side device, a control plane interface between the current server and the designated network side device and then take the designated network side as the predetermined interface in response to a received control plane interface setup request message. The second predetermined interface determination module is configured to acquire, in a case where a deployment position of the current server is internal to the network side device, an existing communication transmission interface between the designated network side device and the network side device where the current server is located and then take the existing communication transmission interface as the predetermined interface.

In an embodiment, the control plane interface setup request message includes at least one of the following information items: a measurement supported by the designated network side device, a reporting mode supported by the designated network side device, a network optimization action supported by the designated network side device or a data plane channel address of the designated network side device.

In an embodiment, the server further includes a control plane interface setup response sending module, which is configured to send a control plane interface setup response message to the designated network side device to indicate that the control plane interface is successfully set up. If the control plane interface setup request message includes the data plane channel address of the designated network side device, when the control plane interface setup response message is sent to the designated network side device, the control plane interface setup response message carries a data plane channel address of the current server.

According to the embodiment of the present application, the server configures and receives the measurement data of the radio network side and the measurement data measured by the UE side to train the machine learning model so as to obtain the network optimization action, thereby performing depth analysis on the collected data through the artificial intelligence and the machine learning, and using the intelligent network optimization method, providing a new optimization method for the operator network optimization and the network intelligent optimization flow.

Figure 8:
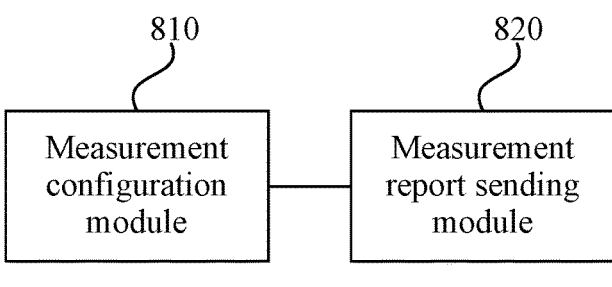
FIG. 8 is a structural diagram of a network side device according to an embodiment of the present application.

FIG. 8 is a structural diagram of a network side device according to an embodiment of the present application. As shown in FIG. 8, the network side device includes the following modules.

A measurement configuration module 810, which is configured to, in response to receiving a session setup request from a predetermined server, perform, according to network side measurement control information in the session setup request, measurement configuration and measurement configuration on a UE connected to a current network side device. A measurement report sending module 820, which is configured to send a measured measurement report of the current network side device and a received measurement report of the UE to the predetermined server, where the measurement report of the current network side device and the measurement report of the UE are used for performing machine learning for network optimization in the predetermined server.

In an embodiment, the measurement configuration module 810 may be configured to in response to the session setup request, perform the measurement configuration according to the network side measurement control information, where the network side measurement control information is used for indicating a measurement quantity and a measurement reporting mode required to be configured by the current network side device; determine, according to the network side measurement control information, a measurement quantity and a measurement reporting mode to be configured by the UE connected to the current network side device as UE side measurement control information; and send a first radio resource control message to the UE to indicate the UE to perform the measurement configuration according to the UE side measurement control information.

In an embodiment, the network side device may further include a session setup response message sending module, which is configured to send, in a case where the measurement configuration is successfully performed on the network side device and a measurement configuration response message of the UE is received, a session setup response message to the predetermined server so as to feed back that the measurement configuration is successfully performed on both the current network side device and the UE to the predetermined server.

In an embodiment, the received session setup request, the session setup response message, and the measurement report sent to the predetermined server each include a corresponding machine learning session identity, and the machine learning session identity is used for uniquely identifying a machine learning process.

In an embodiment, the network side device further includes an action instruction receiving module, which is configured to receive and execute a network optimization action instruction from the predetermined server; an action instruction execution unit, which is configured to determine, in a case where the network optimization action instruction involves the UE, an action in the network optimization action instruction related to the UE; and a related action sending unit, which is configured to send a second radio resource control message to the UE to indicate the UE to perform the related action.

In an embodiment, the current network side device communicates with the predetermined server through the predetermined interface. The network side device may further include a predetermined interface setup request module, which is configured to send, in a case where the deployment location of the predetermined server is external to the current network side device, a control plane interface setup request message to the predetermined server according to the pre-acquired address of the predetermined server, so as to request the predetermined server to set up the control plane interface between the current network side device and the predetermined server and then take the control plane interface as the predetermined interface; and a communication transmission interface acquisition module, which is configured to acquire, in a case where the deployment location of the predetermined server is internal to the current network side device, an existing communication transmission interface between the current network side device and the network side device where the predetermined server is located and then take the existing communication transmission interface as the predetermined interface.

In an embodiment, the control plane interface setup request message includes at least one of the following information items: a measurement supported by the current network side device, a reporting mode supported by the current network side device, a network optimization action supported by the current network side device or a data plane channel address of the current network side device.

In an embodiment, the network side device may further include a control plane interface setup response receiving module, which is configured to, in response to a received control plane interface setup response message, determine that a control plane interface between the current network side device and the predetermined server is successfully set up, where if the control plane interface setup request message includes the data plane channel address of the current network side device, a received control plane interface setup response message includes a data plane channel address of the predetermined server.

According to the embodiment of the present application, the network side device can perform the measurement configuration on the network side device and the UE under the control of the AI server, and can send measurement data obtained by performing measurement on the network side device and measurement data obtained by performing measurement on the received UE to the AI server for performing machine learning for network optimization in the AI server, thereby receiving and executing a network optimization action instruction obtained by the machine learning to perform the network optimization.

Figure 9:
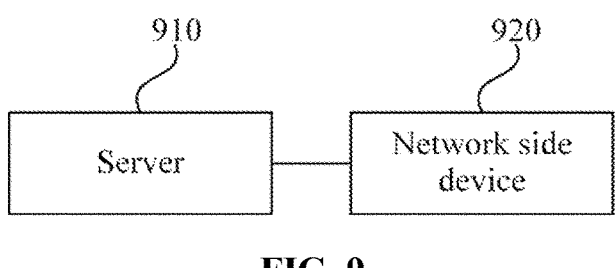
FIG. 9 is a structural diagram of a network optimization system according to an embodiment of the present application.

FIG. 9 is a structural diagram of a network optimization system according to an embodiment of the present application. As shown in FIG. 9, the network optimization system may include a server 910 described below and one or more network side devices 920.

The server 910 can be configured to perform the network optimization method described above in connection with FIG. 1 in embodiment.

The one or more network side devices 920 can be configured to perform the network optimization method described above in connection with FIG. 2 in embodiment.

In this embodiment, the AI server 910 and an AI server described in connection with FIG. 7 has the same or equivalent structure, and can execute the network optimization method applied to the AI server described in the above embodiments. The network side device 920 and a network side device described in connection with FIG. 8 have the same or equivalent structure, and can perform the network optimization method applied to the network side device described in the above embodiments.

The present application is not limited to the specific configurations and processes described above in embodiment and illustrated in the diagrams. For the convenience and brevity of the description, the description of the known method is omitted here, and the working process of the above-described system, modules and units can be referred to the corresponding process in the foregoing method embodiment, and details are not described herein again.

Figure 10:
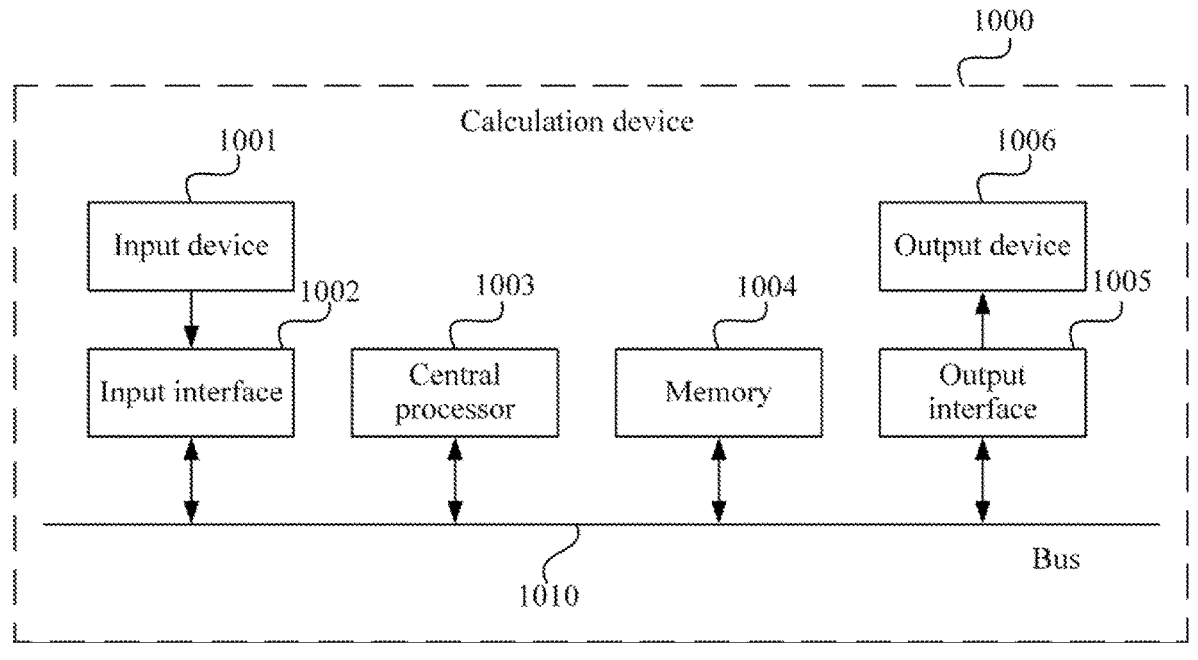
FIG. 10 is a structural diagram of a hardware architecture of a calculation device according to an embodiment of the present application.

FIG. 10 is a structural diagram of a hardware architecture of a calculation device according to an embodiment of the present application.

As shown in FIG. 10, the calculation device 1000 includes an input device 1001, an input interface 1002, a central processor 1003, a memory 1004, an output interface 1005, and an output device 1006. The input interface 1002, the central processor 1003, the memory 1004, and the output interface 1005 are connected to each other through a bus 1010, and the input device 1001 and the output device 1006 are connected to the bus 1010 through the input interface 1002 and the output interface 1005, respectively, and then connected to other components of the calculation device 1000.

The input device 1001 receives input information from the outside and transmits the input information to the central processor 1003 through the input interface 1002. The central processor 1003 processes the input information based on the computer-executable instructions stored in the memory 1004 to generate output information, temporarily or permanently stores the output information in the memory 1004, and then transmits the output information to the output device 1006 through the output interface 1005. The output device 1006 outputs the output information to the outside of the calculation device 1000 for use by a user.

In an embodiment, the calculation device shown in FIG. 10 may be implemented as a server. The server may include a memory and a processor. The memory is configured to store a program, and the processor is configured to run the program stored in the memory to execute the network optimization method applied to the AI server described in the above embodiments.

In an embodiment, the calculation device shown in FIG. 10 may be implemented as a network side device. The network side device may include a memory and a processor. The memory is configured to store a program, and the processor is configured to run the program stored in the memory to execute the network optimization method applied to the network side device described in the above embodiments.

Generally speaking, various embodiments of the present application may be implemented in hardware or special-purpose circuits, software, logic, or any combination thereof. For example, some aspects may be implemented in hardware while other aspects may be implemented in firmware or software executable by a controller, a microprocessor, or another calculation apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program processes, may represent interconnected logic circuits, modules, and functions, or may represent a combination of program processes with logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM), and an optical memory apparatus and system (a digital video disc (DVD) or a compact disk (CD)). Computer-readable media may include non-transitory storage media. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A network optimization method, applied to a server, comprising:

determining network side measurement control information according to pre-acquired policy information to be satisfied by a network;

sending a session setup request to a designated network side device among a plurality of network side devices to request the designated network side device to perform, according to the network side measurement control information, measurement configuration on the designated network side device and measurement configuration on a user equipment (UE) connected to the designated network side device;

receiving a measurement report of the designated network side device and a measurement report of the UE; and performing, based on the policy information and measurement data in received measurement reports, machine learning for network optimization to obtain a network optimization action instruction, wherein the network optimization action instruction is used for indicating the designated network side device and the UE to perform the network optimization according to the network optimization action instruction;

wherein the policy information includes object identity information and communication quality indicator information, and the communication quality indicator information is used for indicating a communication quality required to be achieved by an entity identified by the object identity information, and the communication quality indicator information comprises at least one of the following information items: a network energy saving indicator, a network key performance indicator (KPI), a traffic quality of service indicator, a user quality of experience (QoE) indicator, a traffic-aware key quality indicator (KQI), or a traffic steering preference indicator; and determining the network side measurement control information according to the pre-acquired policy information to be satisfied by the network comprises: determining, according to the entity identified by the object identity information, a network side device to which measurement needs to be performed among the plurality of network side devices as the designated network side device; and determining, according to the communication quality required to be achieved by the entity indicated by the communication quality indicator information, a measurement quantity and a measurement reporting mode that the designated network side device needs to configure as the network side measurement control information.

2. The method of claim 1, before determining the network side measurement control information according to the pre-acquired policy information to be satisfied by the network, further comprising:

acquiring pre-configured policy information to be satisfied by the network; or in response to a received activation message, activating a machine learning function and acquiring policy information to be satisfied by the network and carried in the activation message.

3. The method of claim 1, wherein sending the session setup request to the designated network side device comprises:

in a case where a deployment location of the server is external to any one of the plurality of network side devices, sending the session setup request to the designated network side device, wherein the session setup request comprises the network side measurement control information; or in a case where a deployment location of the server is internal to a network side device of the plurality of network side devices other than the designated network side device, performing the measurement configuration on the network side device where the server is located according to the network side measurement control information, and sending the session setup request to the designated network side device, wherein the session setup request comprises the network side measurement control information.

4. The method of claim 1, after sending the session setup request to the designated network side device, further comprising:

in response to a received session setup response message, determining that the measurement configuration is successfully performed on the designated network side device and the user equipment.

5. The method of claim 4, wherein the session setup request, the session setup response message, and the received measurement report each comprise a corresponding machine learning session identity, and the machine learning session identity is used for uniquely identifying a machine learning process.

6. The method of claim 1, wherein receiving the measurement report of the designated network side device and the measurement report of the UE comprises:

receiving the measurement report of the designated network side device and the measurement report of the UE transmitted by the designated network side device.

7. The method of claim 1, after performing, based on the measurement data in the received measurement reports and the policy information, the machine learning for the network optimization to obtain the network optimization action instruction, further comprising:

sending a network action request message to the designated network side device, wherein the network action request message comprises the network optimization action instruction and an action parameter corresponding to an action.

8. The method of claim 1, wherein the server communicates with the designated network side device via a predetermined interface; and before sending the session setup request to the designated network side device, further comprises: in a case where a deployment location of the server is external to any one of the plurality of network side devices, setting up a control plane interface between the server and the designated network side device, and taking the control plane interface as the predetermined interface in response to a received control plane interface setup request message; or in a case where a deployment location of the server is internal to a network side device of the plurality of network side devices other than the designated network side device, acquiring an existing communication transmission interface between the designated network side device and the network side device where the server is located, and taking the existing communication transmission interface as the predetermined interface.

9. The method of claim 8, wherein the received control plane interface setup request message comprises at least one of the following information items: a measurement supported by the designated network side device, a reporting mode supported by the designated network side device, a network optimization action supported by the designated network side device, or a data plane channel address of the designated network side device.

10. The method of claim 9, after setting up the control plane interface between the server and the designated network side device and taking the control plane interface as the predetermined interface in response to the received control plane interface setup request message, further comprising:

sending a control plane interface setup response message to the designated network side device to indicate that the control plane interface is successfully set up; and in a case where the received control plane interface setup request message comprises the data plane channel address of the designated network side device, and the control plane interface setup response message is sent to the designated network side device, carrying a data plane channel address of the server in the control plane interface setup response message.

11. A non-transitory storage medium storing a computer program, wherein the computer program, when executed by a processor, performs the network optimization method of claim 1.

12. A network optimization method, applied to a network side device among a plurality of network side devices, comprising:

in response to receiving a session setup request from a predetermined server, performing, according to network side measurement control information in the session setup request, measurement configuration on the network side device and measurement configuration on a user equipment (UE) connected to the network side device; and sending a measured measurement report of the network side device and a received measurement report of the UE to the predetermined server, wherein the measurement report of the network side device and the measurement report of the UE are used for performing machine learning for network optimization in the predetermined server;

wherein the network side measurement control information is carried in the session setup request and has been determined according to policy information, the network side measurement control information is used by the network side device to configure a measurement quantity and a measurement reporting mode for the measurement configuration on the network side device and the measurement configuration on the UE, the policy information comprises object identity information and communication quality indicator information, the communication quality indicator information is used for indicating a communication quality required to be achieved by an entity identified by the object identity information, the communication quality indicator information comprises at least one of the following information items: a network energy saving indicator, a network key performance indicator, KPI, a traffic quality of service indicator, a user quality of experience, QoE indicator, a traffic-aware key quality indicator, KQI, or a traffic steering preference indicator, and the entity identified by the object identity information is used for indicating the network side device.

13. The method of claim 12, wherein in response to receiving the session setup request from the predetermined server, performing, according to the network side measurement control information in the session setup request, the measurement configuration on the network side device and the measurement configuration on the UE connected to the network side device comprises:

in response to the session setup request, performing the measurement configuration on the network side device according to the network side measurement control information;

determining, according to the network side measurement control information, the measurement quantity and the measurement reporting mode to be configured by the UE connected to the network side device as UE side measurement control information; and sending a first radio resource control message to the UE to indicate the UE to perform the measurement configuration on the UE according to the UE-side measurement control information.

14. The method of claim 12, wherein in a case where the measurement configuration is successfully performed on the network side device and a measurement configuration response message of the UE is received, sending a session setup response message to the predetermined server so as to feed back that the measurement configuration is successfully performed on both the network side device and the UE to the predetermined server;

wherein the received session setup request, the session setup response message, and the measurement report sent to the predetermined server each comprise a corresponding machine learning session identity, and the machine learning session identity is used for uniquely identifying a machine learning process.

15. The method of claim 12, further comprising:

receiving and executing a network optimization action instruction from the predetermined server;

in the case where the network optimization action instruction involves the UE, determining an action in the network optimization action instruction related to the UE; and sending a second radio resource control message to the UE to indicate the UE to perform the action related to the UE.

16. The method of claim 12, wherein the network side device communicates with the predetermined server via a predetermined interface;

before in response to receiving the session setup request from the predetermined server, performing, according to network side measurement control information in the session setup request, the measurement configuration on the network side device and the measurement configuration on the UE connected to the network side device, further comprising:

in a case where a deployment location of the predetermined server is external to any one of the plurality of network side devices, sending, according to an address of the predetermined server acquired in advance, a control plane interface setup request message to the predetermined server to request the predetermined server to set up a control plane interface between the network side device and the predetermined server and take the control plane interface as the predetermined interface;

in a case where a deployment location of the predetermined server is internal to a network side device of the plurality of network side devices other than the network side device the network side device, acquiring an existing communication transmission interface between the network side device and the network side device where the predetermined server is located and taking the existing communication transmission interface as the predetermined interface.

17. The method of claim 16, wherein the control plane interface setup request message comprises at least one of the following information items:

a measurement supported by the network side device, a reporting mode supported by the network side device, a network optimization action supported by the network side device or a data plane channel address of the network side device.

18. The method of claim 17, further comprising:

in response to a received control plane interface setup response message, determining that a control plane interface between the network side device and the predetermined server is successfully set up, wherein in a case where the control plane interface setup request message comprises the data plane channel address of the network side device, a received control plane interface setup response message comprises a data plane channel address of the predetermined server.

19. A non-transitory storage medium storing a computer program, wherein the computer program, when executed by a processor, performs the network optimization method of claim 12.

20. A network optimization system, comprising:

a server, which is configured to determine network side measurement control information according to pre-acquired policy information to be satisfied by a network; send a session setup request to a designated network side device among a plurality of network side devices to request the designated network side device to perform, according to the network side measurement control information, measurement configuration on the designated network side device and measurement configuration on a user equipment (UE) connected to the designated network side device; receive a measurement report of the designated network side device and a measurement report of the UE; and perform, based on the policy information and measurement data in received measurement reports, machine learning for network optimization to obtain a network optimization action instruction, wherein the network optimization action instruction is used for indicating the designated network side device and the UE to perform the network optimization according to the network optimization action instruction; and the plurality of network side devices, the designated network side device of the plurality of network side devices is configured to in response to receiving the session setup request from the server, perform, according to the network side measurement control information in the session setup request, the measurement configuration on the designated network side device and the measurement configuration on the UE connected to the designated network side device; and send the measurement report of the designated network side device and the measurement report of the UE to the server, wherein the measurement report of the designated network side device and the measurement report of the UE are used for performing the machine learning for the network optimization in the server;

wherein the policy information includes object identity information and communication quality indicator information, and the communication quality indicator information is used for indicating a communication quality required to be achieved by an entity identified by the object identity information, and the communication quality indicator information comprises at least one of the following information items: a network energy saving indicator, a network key performance indicator (KPI), a traffic quality of service indicator, a user quality of experience (QoE) indicator, a traffic-aware key quality indicator (KQI), or a traffic steering preference indicator; and the server is configured to determine the network side measurement control information according to the pre-acquired policy information to be satisfied by the network by: determining, according to the entity identified by the object identity information, a network side device to which measurement needs to be performed as the designated network side device; and determining, according to the communication quality required to be achieved by the entity indicated by the communication quality indicator information, a measurement quantity and a measurement reporting mode that the designated network side device needs to configure as the network side measurement control information.

\* \* \* \* \*